Feb. 24, 1925.

E. J. GOULD 1,527,477

COMPENSATING GEAR

Filed Feb. 8, 1924

INVENTOR
EDWIN J. GOULD
BY
ATTORNEY

Feb. 24, 1925.

E. J. GOULD

COMPENSATING GEAR

Filed Feb. 8, 1924

INVENTOR
EDWIN J. GOULD
BY
ATTORNEY

Patented Feb. 24, 1925.

1,527,477

UNITED STATES PATENT OFFICE.

EDWIN J. GOULD, OF OAKLAND, CALIFORNIA, ASSIGNOR TO NATIONAL MOTOR PARTS COMPANY, OF OAKLAND, CALIFORNIA, A CORPORATION OF CALIFORNIA.

COMPENSATING GEAR.

Application filed February 8, 1924. Serial No. 691,379.

*To all whom it may concern:*

Be it known that I, EDWIN J. GOULD, a citizen of the United States, residing at Oakland, in the county of Alameda and State of California, have invented certain new and useful Improvements in Compensating Gear, of which the following is a specification.

My invention is an improved compensating gear.

The object of my invention is to provide a gear which is highly efficient in operation, simple in construction and inexpensive to manufacture.

This invention relates to the type of compensating gear in which the driving element is linked to the driven elements by means of straps which encircle eccentrics on said driven elements, these straps being pivoted together at one end and linked at the other.

In the annexed drawing in which my invention is illustrated:

Figure 1:
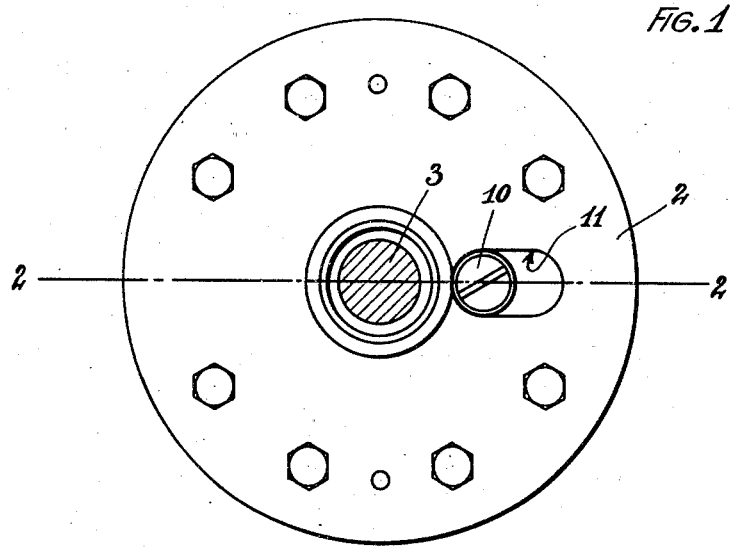
Figure 1 is a side view of my gear.
Figure 2:
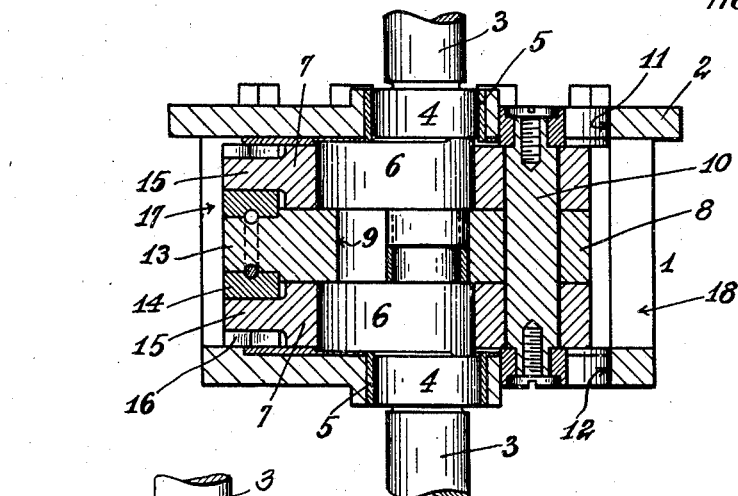
Figure 2 is a sectional view taken on line 2—2 of Figure 1.

Referring more particularly to the drawing, my gear comprises a cylindrical driving element 1, the open end of which is closed by the cover 2. The casing 1 is rotated from any suitable source of power (not shown).

The driven elements 3—3 consist of two aligned shafts which may be the rear axles of a motor vehicle. These shafts are formed with journals 4—4 which rotate in bearings 5—5 in the casing 1 and cover 2. Eccentrics 6—6 are formed on the shafts, and straps 7—7 surround these eccentrics. A block 8 is positioned between the straps 7—7 and an elongated slot 9 is formed therein into which the ends of the shafts 3—3 extend. A pin 10 extends through the straps 7—7 and block 8 and projects through slots 11 and 12 in the cover 2 and bottom of casing 1 respectively. The purpose of this pin and slots will be further described. The block 8 is formed with a pin 13 upon which a link 14 is journaled. Each of the straps 7 are formed with a pin 15 which project through slots 16—16 in the link 14.

If the shafts 3 rotate at a different speed from the casing 1, a transverse motion is imparted to the straps 7—7 and block 8 by the eccentrics 6, causing the pin 10 to reciprocate in the slots 11 and 12 and the block 8 is permitted to reciprocate because of the slot 9. If the shafts 3 rotate at different relative speeds the link 14 will tilt about the pin 13, as will be readily understood.

Slots 17 and 18 are formed in the casing 1 to permit the transverse motion of the straps 7 and block 8.

Figure 5:
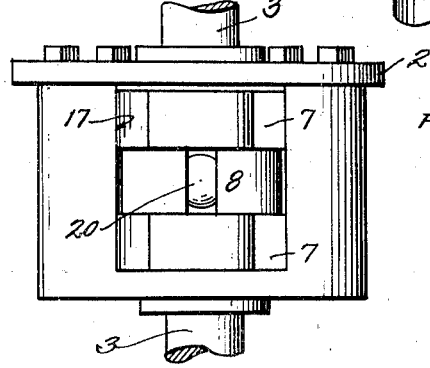
Figure 5 is a plan view of a modified form.
Figure 3:
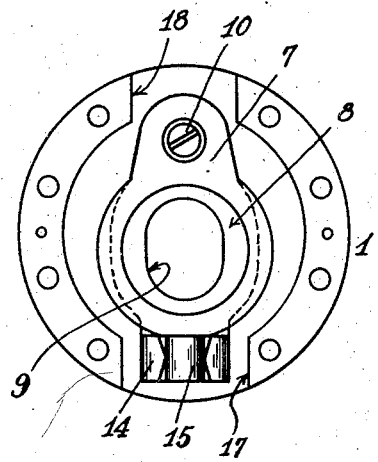
Figure 3 is a side view of my gear with the cap removed.
Figure 4:
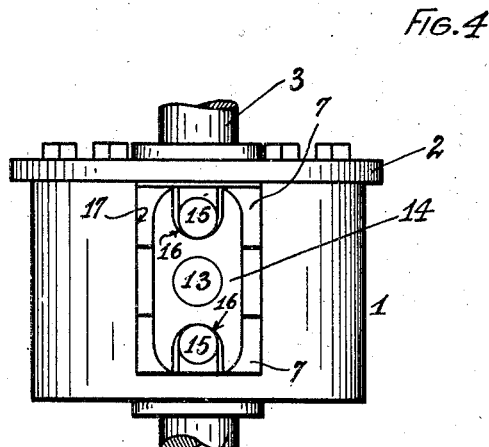
Figure 4 is a plan view of my gear.
Figure 6:
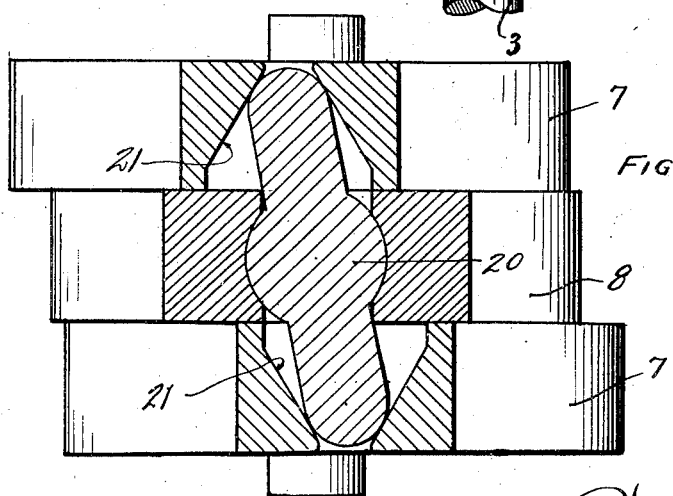
Figure 6 is a transverse sectional view of the link joining the eccentric straps.

In the modified form shown in Figures 5 and 6, the link between the block 8 and straps 7 is slightly altered. A pin 20 is journaled in the block 8 and extends into conical recesses 21 in the straps 7—7. As shown in Figure 6, the pin 20 swings in the block 8 and the recesses 21 permit relative movement of the straps and block.

Having described my invention, I claim:

1. A compensating gear comprising a driving casing, a plurality of driven elements, eccentrics on said driven elements, straps encircling said eccentrics, a block between said straps, means to pin said block and straps together, and a link pivoted in said block and pivotally secured to said straps.

2. A compensating gear comprising a driving casing, a plurality of driven elements, eccentrics on said driven elements, straps encircling said eccentrics, a block between said straps, said casing having slots formed therein, a pin extending through said slots, and through one end of said straps and block, and a link pivoted to the other end of said block and pivotally secured to the straps.

3. A compensating gear comprising a driving casing, a pair of driven shafts journaled in said casing, eccentrics on said shafts, straps encircling said eccentrics, a block between said straps, said block having a slot therein into which said shafts extend, a pin extending through one end of said block and straps, and means to link the other end of said block with the straps.

4. A compensating gear comprising a driving casing, a pair of driven shafts journaled in said casing, eccentrics on said shafts, straps encircling said eccentrics, a block between said straps, said block having a slot therein into which said shafts extend, a pin extending through one end of said block and straps, said casing having slots formed therein into which said pin extends, a link pivoted to said block, and pivotally secured to said straps.

In testimony whereof I affix my signature.

EDWIN J. GOULD.